US012249102B2

(12) United States Patent
Lindgren

(10) Patent No.: US 12,249,102 B2
(45) Date of Patent: Mar. 11, 2025

(54) METHODS AND SYSTEMS FOR OBTAINING AND PROCESSING IMAGES

(71) Applicant: DIMAAG-AI, Inc., Fremont, CA (US)

(72) Inventor: John Lindgren, Santa Rosa, CA (US)

(73) Assignee: DIMAAG-AI, Inc., Fremont, CA (US)

( * ) Notice: Subject to any disclaimer, the term of this patent is extended or adjusted under 35 U.S.C. 154(b) by 185 days.

(21) Appl. No.: 18/053,265

(22) Filed: Nov. 7, 2022

(65) Prior Publication Data

US 2024/0153142 A1 May 9, 2024

(51) Int. Cl.
*G06T 7/80* (2017.01)
(52) U.S. Cl.
CPC ...... *G06T 7/85* (2017.01); *G06T 2207/20081* (2013.01)
(58) Field of Classification Search
CPC ..... H04N 23/683; B25J 9/1697; B25J 19/023; G06T 7/80; G06T 7/85; G06T 7/0004; G06T 2207/20081
USPC ......................................................... 348/47
See application file for complete search history.

(56) References Cited

U.S. PATENT DOCUMENTS

| | | | | |
|---|---|---|---|---|
| 10,848,743 | B2* | 11/2020 | Rowell | H04N 23/683 |
| 11,704,835 | B2* | 7/2023 | Cullen | G06T 7/80 73/1.01 |
| 11,986,955 | B2* | 5/2024 | Agarwal | B25J 9/1697 |
| 2019/0058870 | A1* | 2/2019 | Rowell | H04N 13/189 |
| 2020/0262347 | A1* | 8/2020 | Gupta | H04N 17/00 |
| 2023/0034733 | A1* | 2/2023 | Cullen | G06T 7/80 |
| 2023/0071384 | A1* | 3/2023 | Agarwal | B25J 19/023 |

OTHER PUBLICATIONS

Panoramic 3D Reconstruction Using Rotational Stereo Camera with Simple Epipolar Constraints (Year: 2006).*
Robotic 3D imaging system for under-vehicle inspection; Sukumar; 2006; (Year: 2006).*
Lightning in Inspection; Witkowski; 2017; (Year: 2017).*
Inspection Methods, overview and comparison; 2022; (Year: 2022).*
Lipson, Lahav et al.; RAFT-Stereo: Multilevel Recurrent Field; International Conference on 3D Vision, 2021; Accessed on Oct. 31, 2022 at https://github.com/princeton-vl/RAFT-Stereo.
Stereo photography techniques; Wikipedia, Accessed on Oct. 31, 2022 at https://en.wikipedia.org/wiki/Stereo_photography_techniques#Limitations_of_hyperstereo.

* cited by examiner

*Primary Examiner* — Luis Perez-Fuentes
(74) *Attorney, Agent, or Firm* — Polygon IP, LLP

(57) ABSTRACT

Described herein are methods and systems for obtaining high-quality images, which may be suitable for various applications such as training and operating artificial intelligence (AI) systems. Specifically, a system may comprise multiple cameras and one or more actuators that are capable of moving these cameras relative to each other. For example, these cameras may form one or more stereo pairs, each pair having its stereo axis. The actuators can change baselines in these pairs and/or tilt these stereo axes relative to the imaged objects to address possible self-similarity issues associated with the shape of these objects and their orientation relative to the cameras. In some examples, the simultaneous images captured by these cameras are used to construct a three-dimensional (3D) model. The fidelity of this model is then used to determine the position of the cameras (as a camera unit or individually for each camera).

20 Claims, 12 Drawing Sheets

METHODS AND SYSTEMS FOR OBTAINING AND PROCESSING IMAGES

BACKGROUND

Typical visual inspection systems are equipped with different types and numbers of cameras designed to capture images of inspected objects. However, conventional systems tend to produce images of insufficient quality (e.g., for artificial intelligence processing). Furthermore, conventional systems have difficulties with inspecting certain types of objects (e.g., self-similar objects inspected with stereo-vision cameras). Some conventional systems can be bulky and not suitable for tight-space applications (e.g., mobile inspection systems for agricultural applications). For example, certain inspection applications require cameras to have a large field of view while generating high-quality images, which tends to be conflicting requirements. Illumination to achieve sufficient brightness is another common requirement and is needed to normalize imaging conditions so that nighttime operation produces very similar daylight operation. One approach to address these difficulties is using non-visual inspection systems, such as light detection and ranging (LIDAR) systems. For example, such systems can be used to make digital 3-D representations of inspected areas. However, LIDAR systems can be unsustainable in daylight conditions, which greatly limits the applicability of these systems.

What is needed are new methods and systems for obtaining and processing high-quality images.

SUMMARY

Described herein are methods and systems for obtaining high-quality images, which may be suitable for various applications such as training and operating artificial intelligence (AI) systems. Specifically, a system may comprise multiple cameras and one or more actuators capable of moving these cameras relative to each other. For example, these cameras may form one or more stereo pairs, each pair having its stereo axis. The actuators can change baselines in these pairs and/or tilt these stereo axes relative to the imaged objects to address possible self-similarity issues associated with the shape of these objects and their orientation relative to the cameras. In some examples, the simultaneous images captured by these cameras are used to construct a three-dimensional (3D) model. The fidelity of this model is then used to determine the position of the cameras (as a camera unit or individually for each camera).

In some examples, a method comprises obtaining a plurality of simultaneous images of an object using a camera set. The camera set comprises a first camera and a second camera, each obtaining one of the plurality of simultaneous images. The first camera and second camera collectively establish a stereo axis of the camera set. The camera set is a part of a camera unit further comprising a support structure and a camera-unit actuator. The method then proceeds with constructing a three-dimensional (3D) model from the plurality of simultaneous images using a control unit of the camera unit. When the fidelity of the 3D model is insufficient, the method proceeds with (a) reconfiguring the camera unit using the camera-unit actuator such that the stereo axis of the camera unit has a different orientation relative to the object, (b) obtaining a plurality of new simultaneous images of the object, and (c) updating the 3D model using the plurality of new simultaneous images with the stereo axis of the camera unit being in a different orientation relative to the object.

In some examples, reconfiguring the camera unit comprises at least one of (a) rotating the camera unit relative to the object using the camera-unit actuator, and (b) tilting the second camera relative to the support structure and the first camera using the camera-unit actuator. In the same or other examples, reconfiguring the camera unit further comprises changing a baseline between the first camera and the second camera. Furthermore, in some examples, reconfiguring the camera unit is performed using a camera-orientation configuration generated by the control unit based on the 3D model.

In some examples, reconfiguring the camera unit is performed until the fidelity of the 3D model is sufficient. In other words, obtaining new images of the same object, and updating the 3D model using these new images is repeated until the latest camera-unit configuration yields the required level of fidelity of the 3D model constructed or updated using images obtained with this configuration.

In some examples, the camera unit further comprises a third camera having a different type than either the first camera or the second camera. For example, each of the first camera and the second camera is a panchromatic camera. The third camera can be a color camera. In some examples, the third camera is positioned on the stereo axis formed by the first camera and the second camera. Alternatively, the second camera and the third camera form an additional stereo axis. The additional stereo axis is substantially perpendicular to the stereo axis formed by the first camera and the second camera. In more specific examples, the stereo axis and the additional stereo axis intersect at an optical axis of the second camera.

In some examples, the third camera is movable relative to the support structure also relative and the first camera. This movement is performed using the camera-unit actuator. For example, the third camera is slidable relative to the second camera using the camera-unit actuator. The first camera is tiltable relative to the second camera using the camera-unit actuator. In some examples, the first camera is both slidable and tiltable relative to the second camera using the camera-unit actuator.

In some examples, constructing the 3D model comprises identifying self-similarities among the plurality of simultaneous images of the object at least in directions parallel to the stereo axis of the camera unit. For example, the self-similarities among the plurality of simultaneous images of the object are identified using a machine learning algorithm. The machine learning algorithm used in these operations constructing and operating the 3D model (for determining the desired camera-unit configuration) should be distinguished from other machine learning algorithms that these images and other images are fed into for further processing. The machine learning algorithm described herein can be also referred to as a camera-unit configuration algorithm. The image processing performed by this camera-unit configuration algorithm is used primarily to determine the desired camera-unit configuration.

In some examples, updating the 3D model comprises merging a point cloud generated based on the plurality of simultaneous images with a new point cloud generated based on the plurality of new simultaneous images. In the same or other examples, updating the 3D model is performed using a set of spatial references associated with reconfiguring the camera unit. For example, the set of spatial references corresponds to the camera-orientation configuration used by the camera-unit actuator for reconfiguring the camera unit.

In some examples, the method further comprises performing the following operations when the fidelity of the 3D model is sufficient: (a) moving the camera unit on a gantry to a new location relative to the object; (b) obtaining a plurality of simultaneous new-location images of the object using the camera set; (c) constructing a 3D new-location model from the plurality of simultaneous new-location model images using the control unit; and (d) combining the 3D new-location model and the 3D model to derive a revised 3D model.

In some examples, a mobile inspection system for inspecting an object comprises a vehicle, a gantry (that is attached to the vehicle and that comprises a gantry actuator), and a camera unit slidably attached to the gantry. The camera unit comprises a camera set, comprising a first camera and a second camera. Each camera is configured to obtain one of a plurality of simultaneous images. The first camera and the second camera collectively establish a stereo axis of the camera set. The camera unit also comprises a control unit communicatively coupled to the camera set and configured to construct a three-dimensional (3D) model, having fidelity, from the plurality of simultaneous images. The camera unit also comprises a camera-unit actuator, which is communicatively coupled to the control unit and mechanically coupled to the camera set. The camera-unit actuator is operable to reconfigure the camera unit when the fidelity of the 3D model is insufficient, such that the stereo axis of the camera unit has a different orientation relative to the object.

DETAILED DESCRIPTION

Figure 1A:
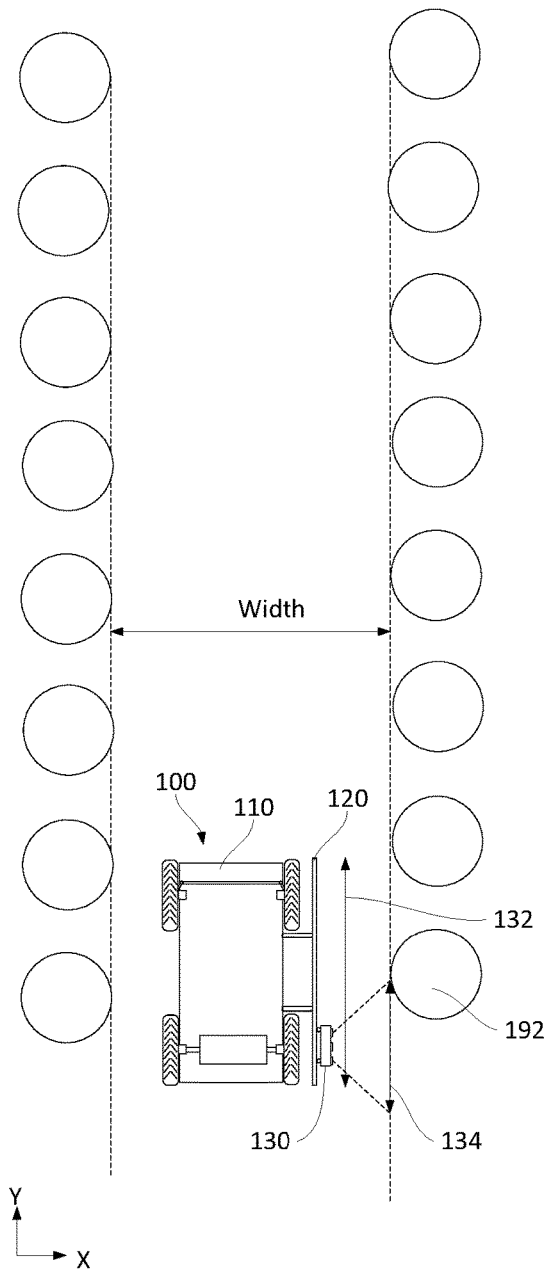
FIG. 1A is a schematic top view of a mobile inspection system, comprising a gantry and a camera unit slidably attached to the gantry, traveling among objects being inspected by the system, in accordance with some examples.

In the following description, numerous specific details are outlined to provide a thorough understanding of the present invention. The present invention may be practiced without some or all of these specific details. In other instances, well-known process operations have not been described in detail to avoid obscuring the present invention. While the invention will be described in conjunction with the specific examples, it will be understood that it is not intended to limit the invention to the examples.

Introduction

Artificial intelligence/machine learning (AI/ML) techniques are gaining popularity for image processing such as visual inspections of various objects. However, these techniques require images of sufficient quality for model training and operational purposes. At the same time, obtaining high-quality images can be challenging due to the endless variations in imaged objects, e.g., the shape and orientation of these objects relative to the camera, lighting, and such. Furthermore, image acquisition often needs to happen very quickly with limited opportunities to adjust cameras and other associated equipment. As a result, many conventional cameras are generally not suitable for special AI/ML applications. At the same time, the use of complex/expensive systems is often not practical or even possible for many applications.

The methods and systems, which are described herein, address these issues by utilizing specially-configured camera units and other components. For example, a camera unit comprises two or more cameras, associated with one or more stereo axes. In other words, multiple cameras in the same camera units form one or more stereo pairs (e.g., three cameras can form up to three stereo pairs). These stereo axes can be substantially perpendicular to each other (e.g., an angle of 80°-90° or even 85°-90°). Alternatively, the stereo axes can be substantially colinear (e.g., an angle of 0-10° or even 0-5°). In some examples, a camera unit comprises one or more actuators (i.e., a camera-unit actuator) that can change one or more baselines of various stereo pairs, change the orientation of the stereo axes to each other, and/or change the orientation of these stereo axes relative to inspected objects. These changes in configurations of the camera unit are performed by these one or more camera-unit actuators in a precise manner such that the images taken by the cameras, at different configurations of the camera unit, can be easily combined to improve the overall image quality or, more specifically, the fidelity of a 3D model constructed from multiple images obtained by the camera unit. The camera-unit actuators control the relative orientation of the cameras in a precise manner. Furthermore, this change in the camera-unit configuration happens sufficiently fast such that various conditions of the image object (e.g., movement, lightning) are substantially static.

It should be noted that at each given time, a camera unit obtains a plurality of simultaneous images (one image by each camera). These images are used for constructing a 3D model. Furthermore, the camera obtains an additional plurality of simultaneous images (after the camera unit is reconfigured), and these new images are used to update the 3D model (e.g., if the original model does not have sufficient fidelity). It should be noted that this additional plurality of simultaneous images is of the same object and is taken during a relatively short time from the original image set.

Specifically, one or more camera-unit actuators provide additional functionalities that are not possible with the static arrangement of cameras (e.g., in conventional stereo cameras). For example, with a static input scene (i.e., minimal changes in the conditions of the imaged object), a two-camera unit with an actuator can replicate the functionality of a three-camera unit (e.g., by performing precision camera rotation, and two-step movement of two-camera assembly). This additional functionality can be used for obtaining images of self-similar objects. For example, an actuator can be used for obtaining multiple sets of stereo images using different poses (e.g., rotating the camera by a certain angle or moving in a "two-step" fashion). These multiple image sets are then processed using, e.g., a machine learning algorithm to remove artifacts. With fewer cameras, a camera unit can be smaller in size and lighter, which is particularly important when the camera unit is supported using a robotic arm. In some examples, multiple image sets can be compared to derive additional information (from pose differences) such as illumination variation and possibly combining poses to improve the overall accuracy.

Furthermore, multiple image sets can produce improved resultant fidelity of the 3-D model, which is measured by determining the accuracy of derived 3D models. This characteristic reflects whether the model has artifacts, missing features caused by stereo mismatches, and/or pose misalignments with an object space coordinate system. It should be noted that the last point is typically mitigated by a series of geometric calibrations. The model accuracy is determined using various factors, such as geometric calibration, stereo disparity computation, and the knowledge of the imaging subject position and orientation has an error. Overall, such systems can produce fewer artifacts associated with self-similar objects that have symmetry in the parallax direction.

It should be noted that self-similar items do not have to be linear features such as wires and other linear objects. For example, smooth surfaces with no obvious features (providing specific 3D clues on what space this surface occupies) can be viewed as self-similar objects. To address this feature deficiency, a control unit can consider a boundary (which is a 2D object) of the smooth object and determine if this boundary can be used to extract the underlying 3D information. Rotating the camera unit (using an actuator) may be used to identify ("pop out") such boundaries.

It has been found that machine learning for stereo disparity generation has proven itself to be far superior to conventional stereo matching algorithms in well-controlled objective competitive testing. The basic concept for machine learning is to provide a wide range of stereo pairs taken under a variety of conditions and to have an algorithm that uses a layered regression model along with back error propagation to adjust weights until a well-performing stereo disparity system is derived.

In some examples, a camera unit is used as a part of a mobile inspection system, which further comprises a vehicle and a gantry. The camera unit is slidably attached to the gantry and is used for taking multiple different images of the object from different linear positions of the camera unit. This movement of the camera unit, relative to the object, should be distinguished from reconfiguring the camera unit describes above (e.g., changing one or more baselines of various stereo pairs, changing the orientation of the stereo axes to each other, and/or changing the orientation of these stereo axes relative to inspected objects). Furthermore, the vehicle can move the camera unit between different imaging locations (beyond the gantry range) thereby allowing fast and efficient imaging of many different locations.

Examples of Mobile Inspection Systems

Referring to FIGS. 1A-1D, mobile inspection system 100 comprises vehicle 110, gantry 120, and camera unit 130, slidably coupled to gantry 120. Any types of vehicle 110 are within the scope, e.g., an all-terrain vehicle (ATV), a tractor, and the like. Vehicle 110 can be driven by an operator or can be an autonomous vehicle. The type and size of vehicle 110 can be selected depending on the application, e.g., space available for vehicle 110.

Figure 3A:
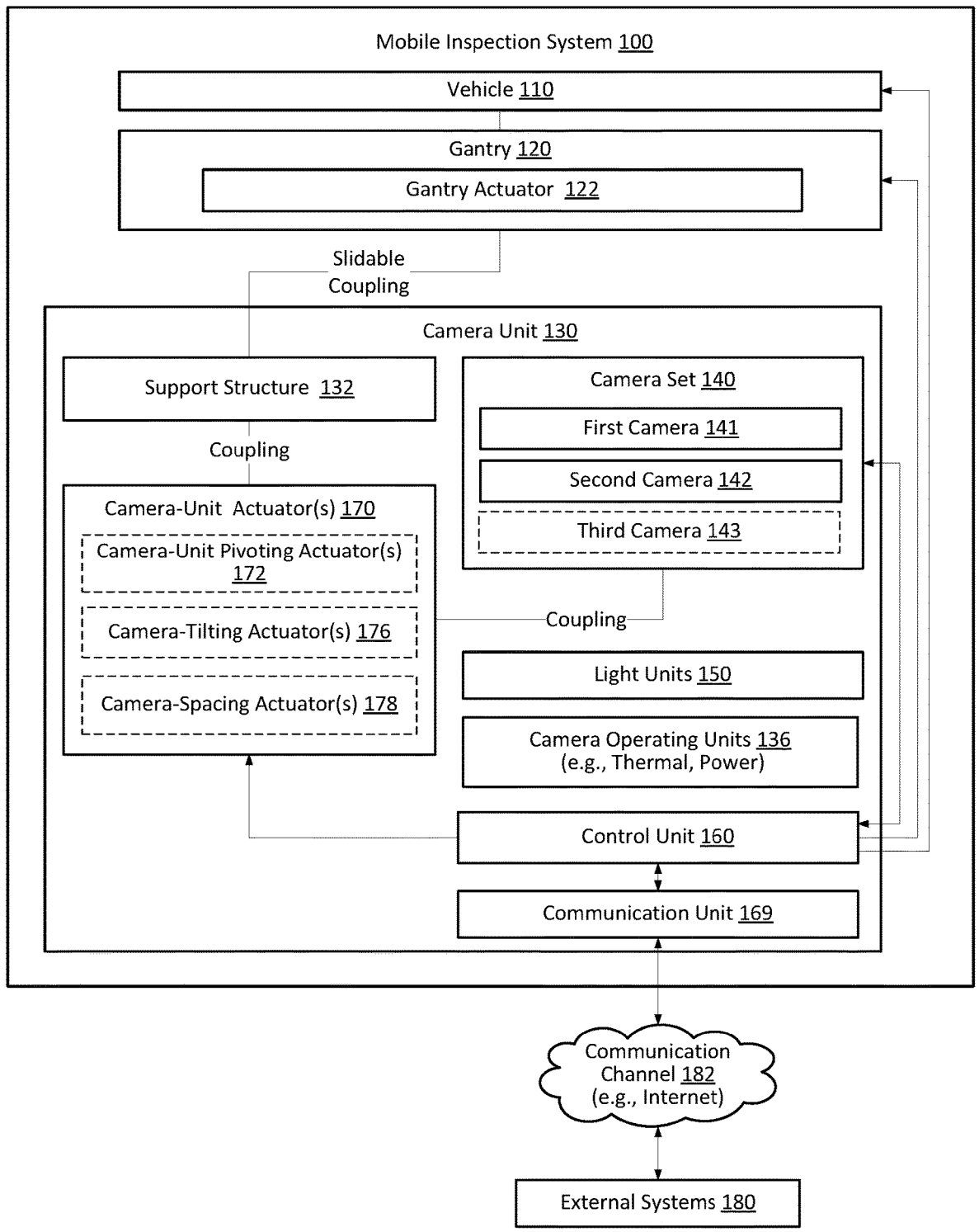
FIG. 3A is a block diagram illustrating various components of a mobile inspection system, in accordance with some examples.

Gantry 120 is attached to vehicle 110 (e.g., to the frame of vehicle 110) and is used to support camera unit 130 and to reposition (e.g., slide) camera unit 130 relative to vehicle 110. This repositioning is used to obtain multiple images of inspected object 192 as, e.g., schematically shown in FIGS. 1B-1D. For example, gantry 120 can include a set of rails extending parallel to the center axis of vehicle 110 (e.g., along the Y-axis in FIG. 1A). In some examples, gantry 120 or camera unit 130 comprises an actuator (e.g., a step motor) for changing the position of camera unit 130 on gantry 120 as further described below with reference to FIG. 3A.

In some examples, vehicle 110 is stationary while obtaining multiple images of inspected object 192. Alternatively, vehicle 110 can continue to move while obtaining the images and moving camera unit 130. In this alternative example, the speed of moving camera unit 130 (on gantry 120) relative to vehicle 110 is faster than the speed with which vehicle 110 moves relative to inspected object 192. Furthermore, the vehicle speed and image timestamp are taken into account when determining the position of camera unit 130 relative to inspected object 192 for each image.

The number of images of the same object could be two, three, four, or more (e.g., seven). The number of images can be selected based on the size of inspected object 192 (or, more specifically, the size of the inspection area), camera FOV 134, and the proximity of the camera to inspected object 192, all of which are further described below. The criteria for the number of cameras, the number and separation of viewpoints, and stereo baseline lengths directly relate to mission requirements for 3D model accuracy. For example, at least 6 images from different positions (or more depending on object topology) may be used to determine all 6 sides of an asymmetric 3D object. For purposes of this disclosure, images obtained from different positions can be referred to as views. It should be noted that each view can have a plurality of simultaneous images, e.g., each obtained by a different camera of camera unit 130. Furthermore, in some examples, each view can have multiple pluralities of simultaneous images such that each plurality of simultaneous images corresponds to a different configuration of camera unit 130.

In some examples, various assumptions related to the shape and the object's known connection characteristics to other objects can reduce the number of required views. For example, perfectly cylindrical objects with unknown radii can be modeled using a stereo pair. It should be noted that the scale of such objects cannot be determined using a single image without additional assumptions. Furthermore, mission-specific requirements can drive the number of required views. Multiple overlaps of the field of view (FOV 134), with imaging sensors being equivalent, provide improved accuracy. In this example, the assumption is that random error portions have a zero-mean (no bias) Gaussian distribution, with a corresponding improvement being one over the square root of the number of measurements. As such, four overlapping measurements improve the random error by a factor of 0.5 (i.e., one over the square root of four).

Figure 1B:
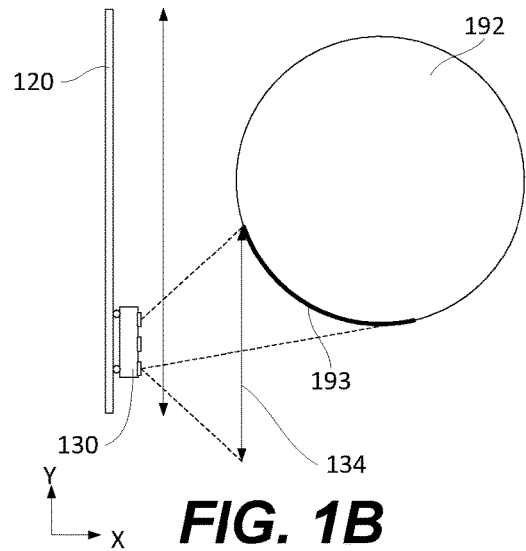
FIGS. 1B-1D are schematic top views of different positions of a camera unit relative to an inspected object, enabled by a gantry of the inspection system in FIG. 1A, in accordance with some examples.
Figure 1C:
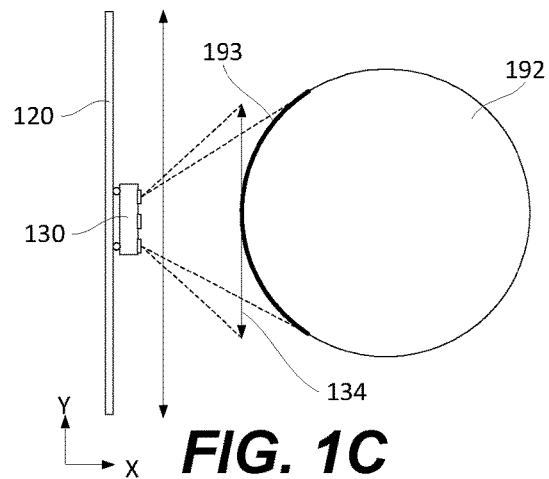
Figure 1D:
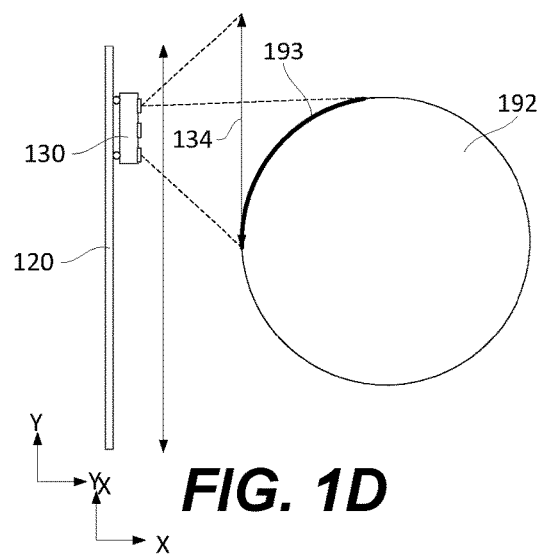

These overlaps are schematically shown in FIGS. 1B-1D with different inspection surfaces 193 of the same inspected object 192 caused by different positions of camera unit 130 relative to inspected object 192. The size of each inspection surface 193 depends on the distance of camera unit 130 relative to inspected object 192 (or, more specifically, the distance of each camera in camera unit 130) and FOV 134 of each camera in camera unit 130. However, camera unit 130 is reposited in such a way that inspection surfaces 193 of two views have sufficient overlaps that allow combining individual 3D models/cloud points into one mega cloud associated with inspected object 192. In other words, the mobility of camera unit 130 on gantry 120 creates a new system-level "stereo baseline" in addition to one or more stereo baselines of camera unit 130. This system-level "stereo baseline" can be much larger than the unit-level stereo baselines. It should be noted that a larger baseline helps with inspecting large objects while a smaller baseline allows a more accurate combining of images obtained by different cameras. In other words, gantry 120 allows positioning camera unit 130 very close to large inspection objects (e.g., due to the space constraints and/or more accurate imaging of specific portions of these objects).

Figure 1E:
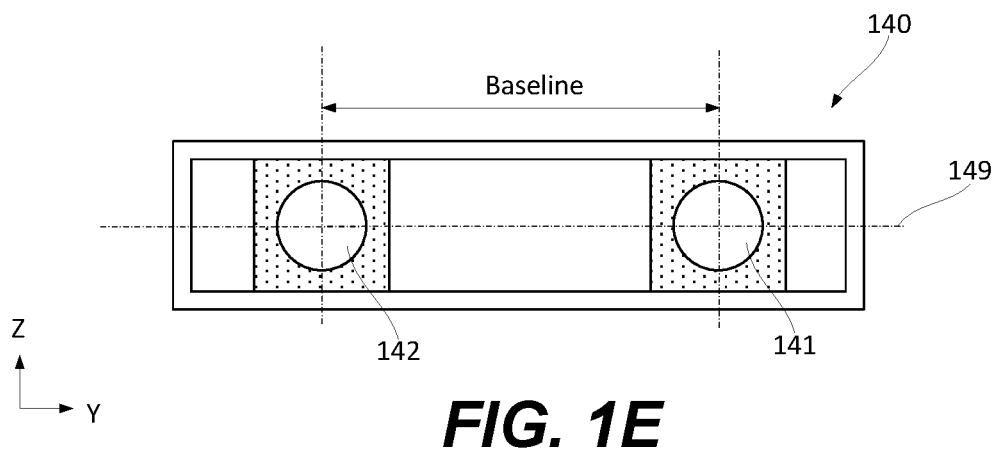
FIG. 1E is a schematic front view of a stereo camera set, which can be used in the inspection system in FIG. 1A, in accordance with some examples.
Figure 1F:
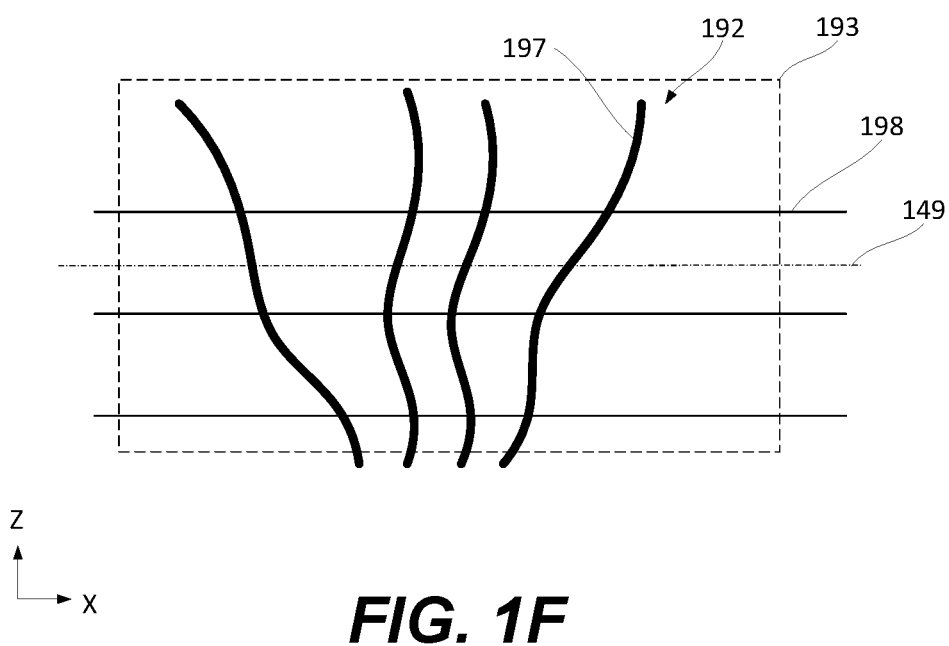
FIG. 1F is a schematic front view of an object being inspected by the stereo camera set in FIG. 1E further illustrating various features of the stereo camera set in FIG. 1E, in accordance with some examples.

FIG. 1E illustrates one example of camera set 140 comprising first camera 141 and second camera 142, collectively forming stereo axis 149. This camera set 140 may be also referred to as a stereo pair. The optical axes (the centers) of first camera 141 and second camera 142 are separated by a baseline. In addition to various inherent complexities of stereo pairs (e.g., the difficulties of maintaining parallel optical axes and maintaining the baseline perpendicular to these axes, calibration), there are certain types of objects that are difficult to accurately image with stereo pairs. For example, FIG. 1F illustrates object 192, which has first object portions 197 and second object portions 198. Stereo axis 149 of camera set 140 is shown as a reference to illustrate a deficiency of camera set 140 in this configuration. Specifically, stereo axis 149 of camera set 140 is parallel to second object portions 198. For example, second object portions 198 can be wires extending parallel to each other. In this configuration, second object portions 198 are self-similar. For purposes of this disclosure, a self-similar object is an object that produces a stereoscopic pair of images that have no sufficiently detectable differences. In other words, both images are substantially similar despite the different positions of the two cameras (separated by a baseline) relative to the object. It should be noted that this self-similar aspect depends on the orientation of an object relative to a stereo camera. As such, by changing the relative orientation of an object and a stereo camera, the object can become self-similar or not. It should be noted self-similar objects don't have to be linear. For example, smooth surfaces that don't have any obvious features could be also categorized as self-similar.

Figure 2A:
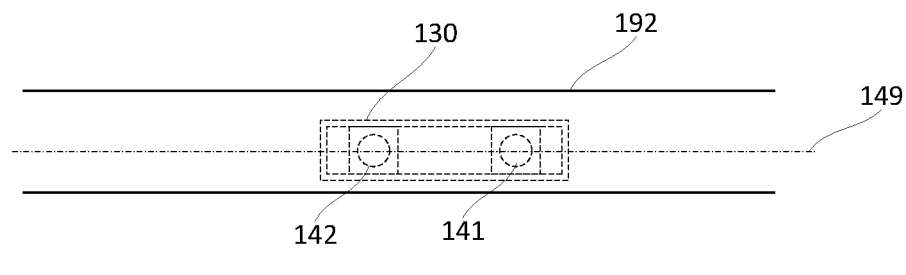
FIGS. 2A and 2B are schematic views of an inspected object and a stereo camera set, which is used for imaging the object in two different orientations of the stereo camera set relative to the object, in accordance with some examples.
Figure 2B:
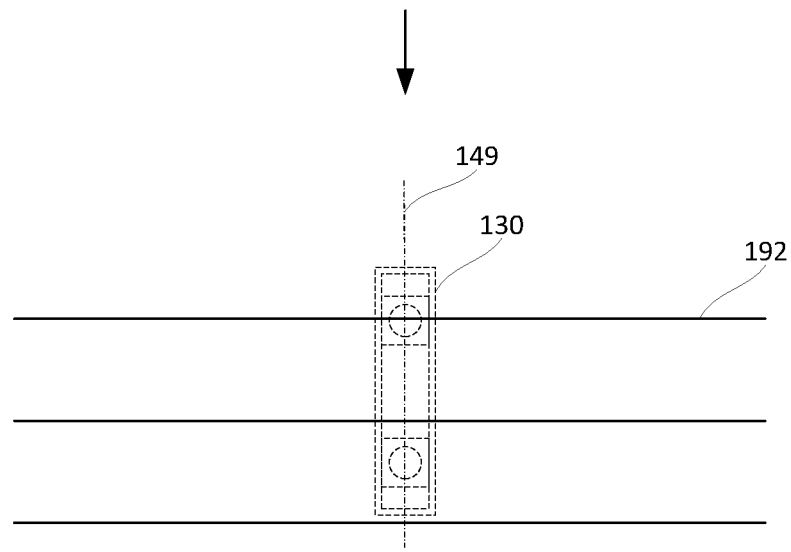

One approach to address self-similarity in inspected objects is to rotate the stereo pair as shown in FIGS. 2A-2B. While imaged object 192 is self-similar relative to camera unit 130 in FIG. 2A, rotating/tilting camera unit 130 by 90° as shown in FIG. 2B addresses this self-similarity issue. While the 90° tilt/rotation may be ideal in the example shown in FIGS. 2A and 2B, other rotation angles are within the scope. In some examples, camera unit 130 can be rotated (e.g., using a stepper motor) through multiple different orientations representing the range of 0-90° or even 0-180° or even 0-360° and different pluralities of simultaneous images, each plurality obtained at a different orientation is combined into the same 3D model to obtain the accurate representation of inspected objects. While a larger number of different orientations may help to obtain a more accurate representation of inspected objects, combining these images requires additional computing power and may simply be not needed or practical for some applications. Furthermore, the rotating angle may be specifically determined from the analysis of the initial image as further described below. In some examples, the rotational axis substantially coincides with the optical axis of one camera. Alternatively, the rotational axis can bisect the baseline.

Figure 2C:
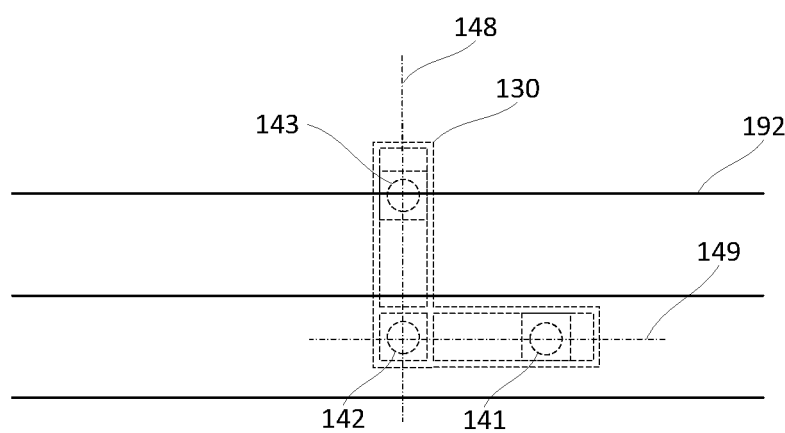
FIG. 2C is a schematic view of an inspected object and a camera set comprising three cameras arranged into two stereo pairs, in accordance with some examples.

FIG. 2C illustrates another example of camera unit 130, which comprises first camera 141, second camera 142, and third camera 143. First camera 141 and second camera 142 form stereo axis 149. Second camera 142 and third camera 143 form additional stereo axis 148. It should be noted that first camera 141 and third camera 143 form yet another stereo axis that is not specifically identified in FIG. 2C. However, this third stereo axis may not be used as a reference for the image analysis, in some examples. This camera unit 130 may be referred to as a 3-camera unit or a 2-stereo-axis unit (or, more generally, a multi-stereo-axis unit). In some examples, stereo axis 149 and additional stereo axis 148 are substantially perpendicular to each other (e.g., an angle is 80-90° or even 85-90°). This example may be referred to as an L-shaped 3-camera unit. In this example, inspected object 192 is self-similar with reference to stereo axis 149 and can not be inspected using a pair of first camera 141 and second camera 142 but can be still inspected by second camera 142 and third camera 143. Furthermore, it should be noted that this 3-camera unit can include a camera-unit actuator for, e.g., changing one or more baselines of various stereo pairs, changing the orientation of the stereo axes to each other, and/or changing the orientation of these stereo axes relative to inspected objects 192.

Figure 2D:
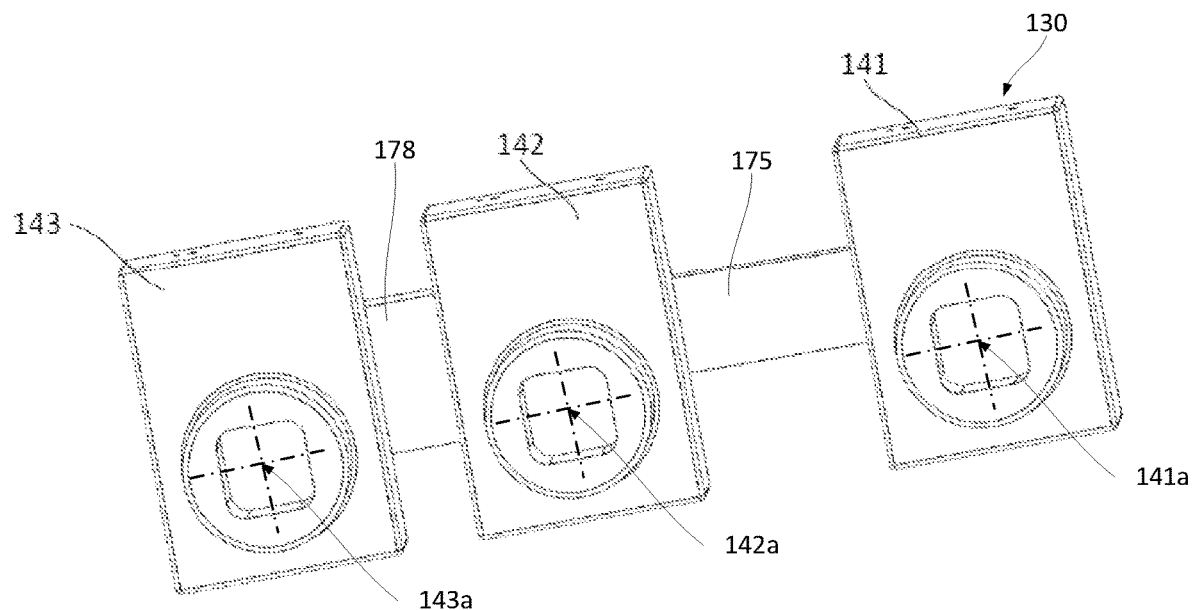
FIGS. 2D and 2E are schematic views of a camera set comprising three cameras illustrating different mechanisms for moving the cameras relative to each other, in accordance with some examples.
Figure 2E:
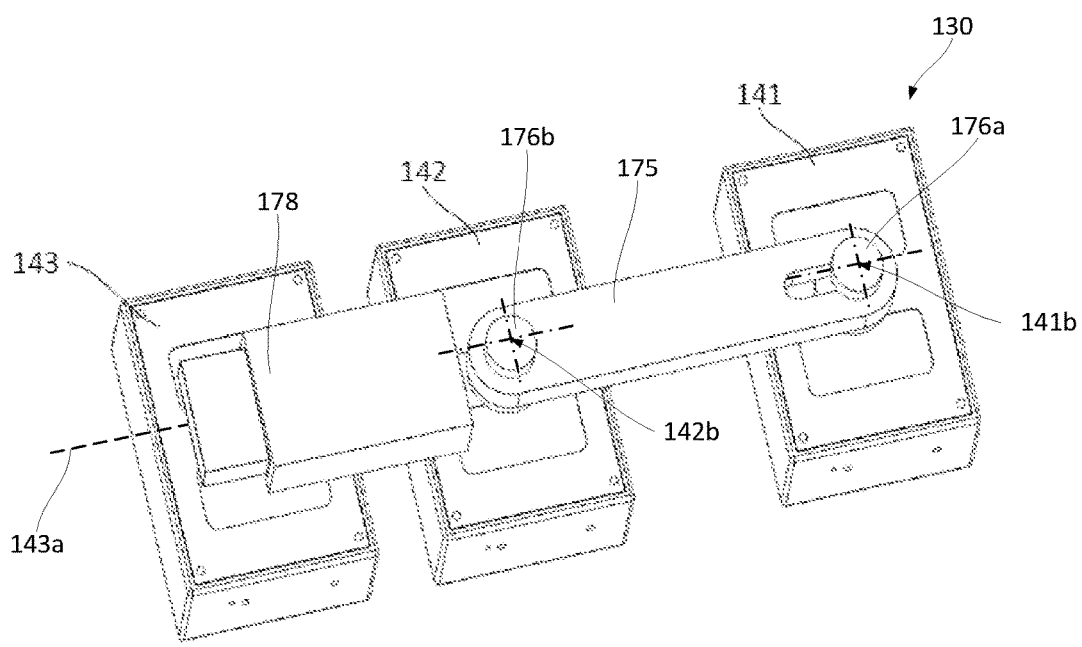
Figure 2F:
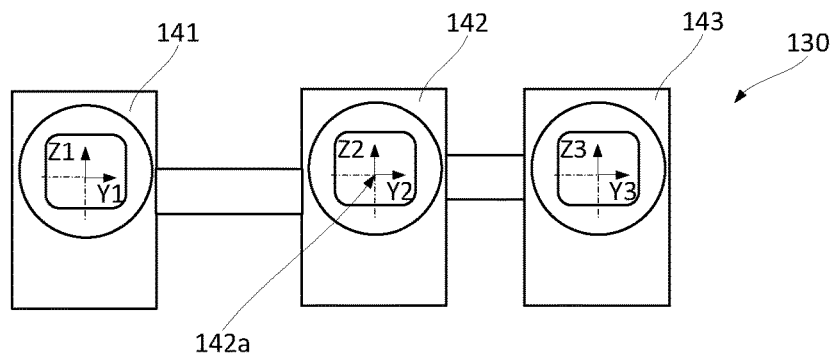
FIGS. 2F-2I are schematic front views of the camera set in FIGS. 2D and 2E, which illustrate different configurations of this set, in accordance with some examples.
Figure 2G:
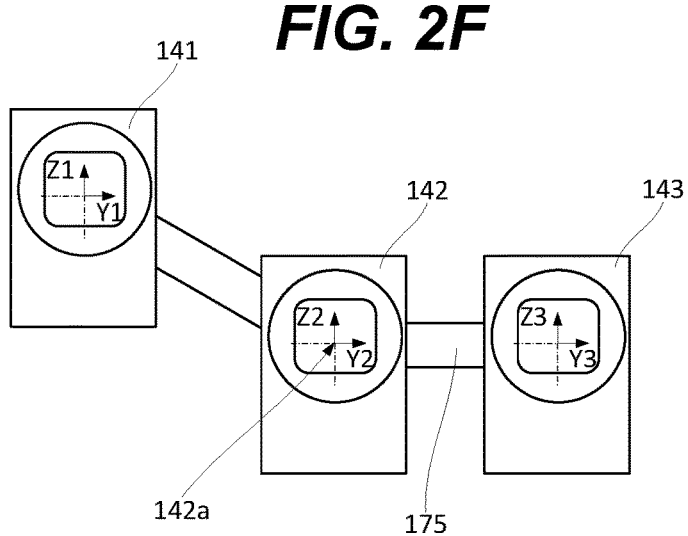
Figure 2H:
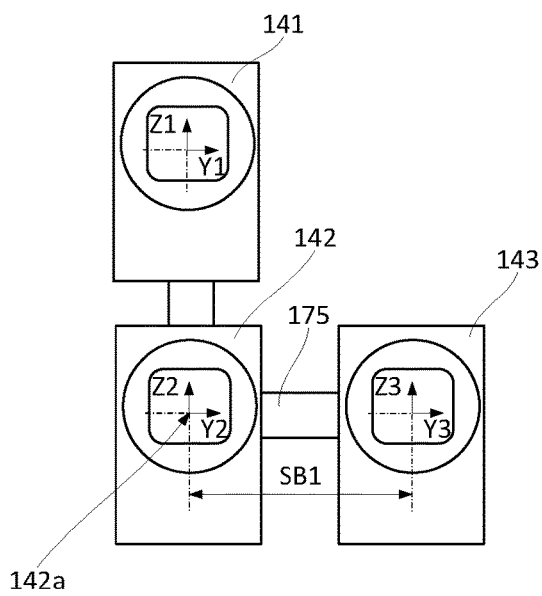

FIGS. 2D and 2E are schematic front and back perspective views of camera unit 130, which comprises first camera 141, second camera 142, and third camera 143, illustrating components enabling different configurations of this camera unit 130. Specifically, first camera 141 and second camera 142 are coupled by connecting arm 175 and two camera-tilting actuators 176a and 176b. For example, first camera-tilting actuator 176a couples connecting arm 175 to first camera 141 and is configured to rotate first camera 141 relative to connecting arm 175 about first rotating axis 141b (that, in some examples, may coincide with first optical axis 141a of first camera 141). Similarly, second camera-tilting actuator 176b couples connecting arm 175 to second camera 142 and is configured to rotate second camera 142 relative to connecting arm 175 about second rotating axis 142b (that, in some examples, may coincide with second optical axis 142a of second camera 142). This combination of connecting arm 175 and two camera-tilting actuators 176a and 176b allows for preserving the rotation position of each camera relative to an inspected object while changing the orientation of the stereo baseline formed by these two cameras as, for example, is shown in FIGS. 2F-2H. In this example, first camera 141 is rotated about second camera 142 or, more specifically, about second rotating axis 142b, which may correspond to the optical axis of second camera 142. It should be noted that, in some examples, the angular orientation in spaces of first camera 141 and second camera 142 is preserved. For example, FIGS. 2F-2H illustrate that the X1 axis of first camera 141 remains parallel to the X2 axis of second camera 142 (similarly, to the Y1 and Y2 axes). This angular orientation is ensured by a combination of the camera-tilting actuators 176a and 176b that turn first camera 141 and second camera 142 relative to connecting arm 175 during the overall rotation operation.

Figure 2I:
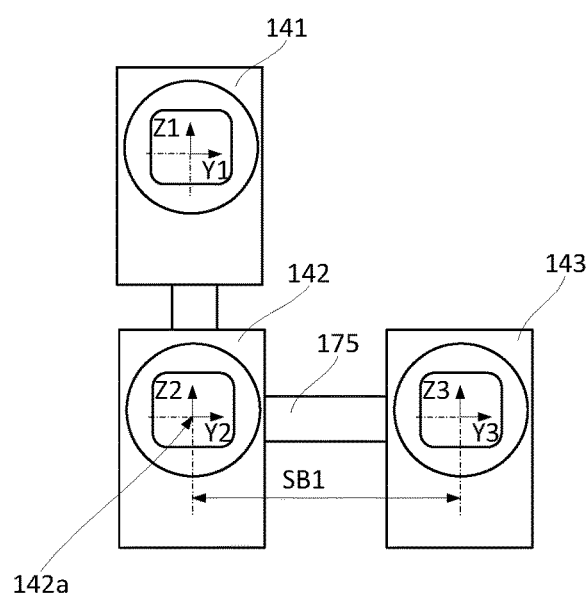

Furthermore, in some examples, connecting arm 175 is equipped or replaced with a linear actuator that can change the length of the stereo baseline. For example, second camera 142 and third camera 143 are connected by camera-spacing actuator 178 that is configured to slide third camera 143 relative to second camera 142 along stereo axis 143a thereby changing the length of the stereo baseline formed by second camera 142 and third camera 143 as, e.g., is schematically shown in FIGS. 2H and 2I.

Additional components of mobile inspection system 100 will now be described with reference to FIGS. 3A-3E. In addition to camera set 140 (comprising two or more cameras), camera unit 130 may comprise one or more light units 150, one or more camera operating units 136 (e.g., power supplies, thermal-management units), control unit 160, communication unit 169, support structure 132, and one or more camera-unit actuators 170. As noted above, camera-unit actuators 170 are used for reconfiguring camera unit 130 and should be distinguished from gantry actuator 122, which is used for sliding camera unit 130. Communication unit 169 can be used for establishing communication channel 182 (e.g., via Internet) with various external systems 180.

Figure 3B:
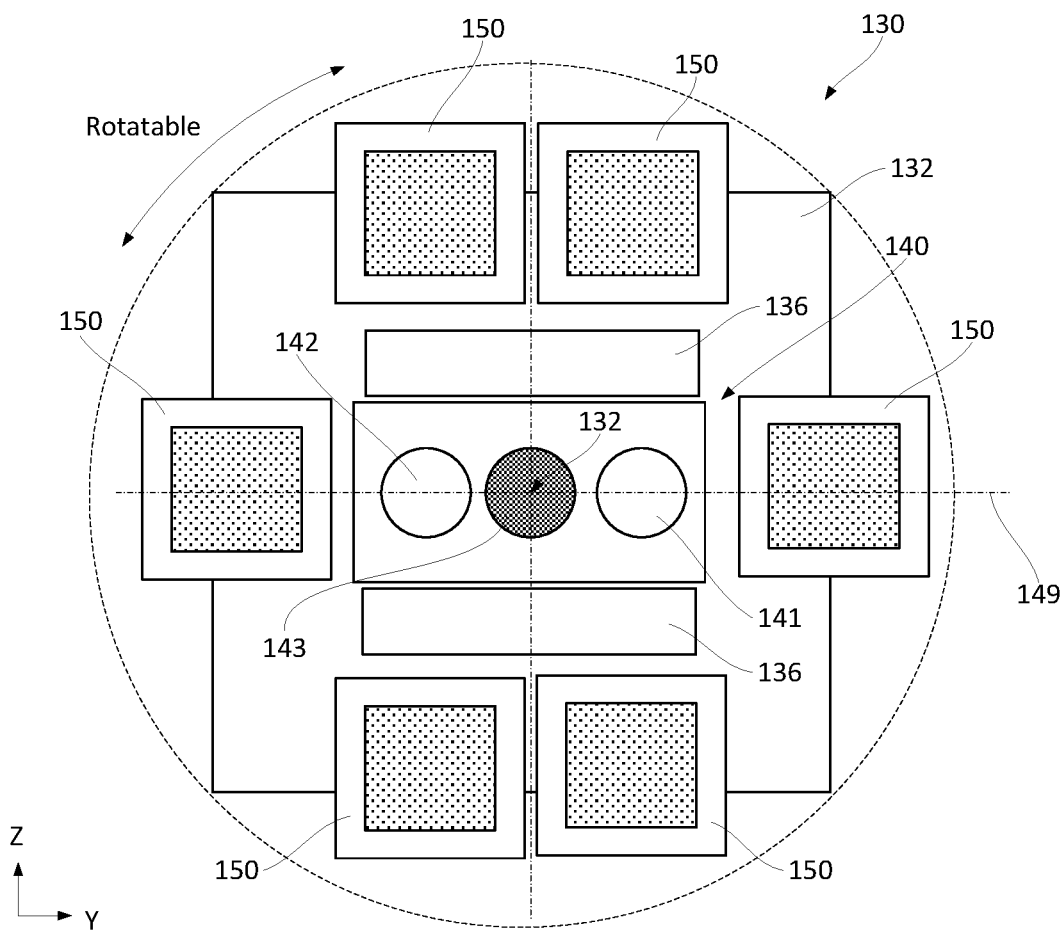
FIG. 3B is a schematic front view of a camera unit illustrating one example of the arrangement of different components of the camera unit, in accordance with some examples.

Referring to FIG. 3B, multiple light units 150 can be arranged in various configurations, e.g., surrounding camera set 140, and supported with support structure 132. In some examples, camera-unit actuators 170 can be used to move light units 150 relative to camera set 140. Overall, support structure 132 (for camera set 140 and light units 150) maintains the stable relative positions of these units. It should be noted that mobile inspection system 100 can be operated under various ambient light conditions (e.g., during the day or night). Light units 150 ensure consistent illumination of inspected object 192 regardless of variations in the ambient lighting conditions. Light units 150 effectively normalize major variations of ambient light conditions to provide consistent image characteristics. In some examples, the target illumination at the time of camera exposure is within 50% of the normal ambient midday daylight. Consistent illumination helps to greatly reduce the camera integration times and thus simplifies the background imaging (e.g., the background can be in the dark) benefitting machine learning performance. The focal plane performance with short but usable exposure times and 0 dB brightness gain may produce minimal background and read noise. It should be noted that continuous illumination is not needed while obtaining still images. A very short (e.g., between about 100 microseconds and 200 microseconds) light pulses save energy and reduce wear on the light source (in comparison to longer pulses or continuous illumination). For example, the power of a light source can be as much as 100 W or more even more during the illumination. As such, the exposure time used by camera assembly 130 can be relatively short, e.g., driven by the illumination duration. In the same examples, the exposure time is between 40 microseconds and 50 microseconds. It should be noted that the illumination falls off very rapidly away from the target and thus, for short exposures, produces a dark background. It should be also noted that the illumination and the exposure (image capturing) should be coordinated to ensure that the exposure happens during the illumination period. In other words, the exposure period fully overlaps and is positioned within the illumination period. The tighter the coordination, the less power will be required for the illumination source. Overall, the integration (exposure) time and illumination power control and timing are important to produce consistent images for any AI-related uses (model training and/or model use).

Figure 3C:
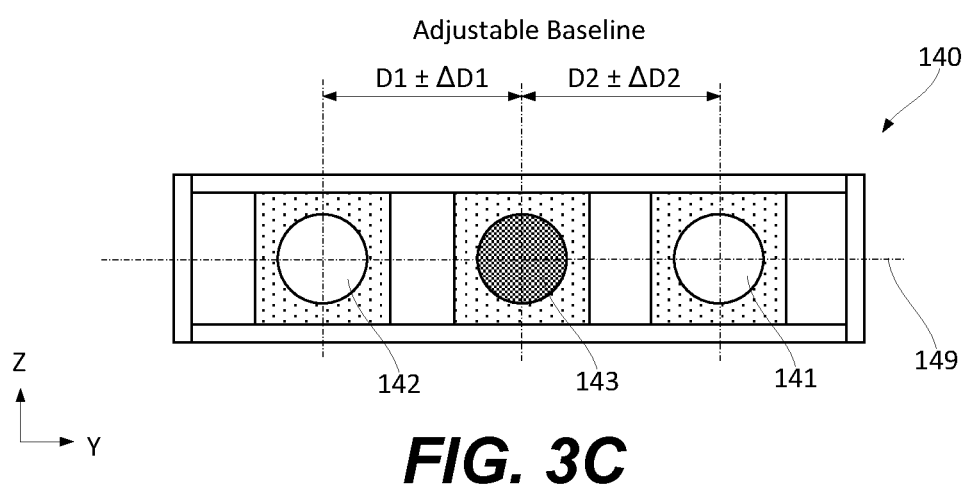
FIG. 3C is a schematic front view of a camera set comprising three cameras arranged along the stereo axis, in accordance with some examples.

Referring to FIG. 3C, in some examples, camera set 140 may comprise different types of cameras, e.g., a combination of panchromatic and color cameras. For example, first camera 141 and second camera 142 can be two panchromatic cameras, while third camera 143 can be a color camera. A panchromatic camera uses a single homogeneous focal plane, which allows for a greater spatial resolution when compared to a color camera. Stereo-matching is performed using combinations of collected images (Pan/Pan, Left Pan/Color, Color/Right Pan). The color imagery requires standard mapping to a simulated panchromatic image prior to stereo-matching for classical matching. A second option is to directly feed a trained neural network color and panchromatic images for stereo processing. Overall, panchromatic cameras help to improve the overall quality of 3D models, through the greater modulation transfer function (MTF) performance and hence derived 3D model accuracy. At the same time, a color camera helps to retain the color information, which may be needed to assess certain characteristics of inspected object 192. Overall, panchromatic cameras help to increase the 3D model accuracy (by switching from conventional color cameras) because color cameras have poor edge quality when compared to equivalent, unfiltered, panchromatic imagery. For example, noisy edges result in noisy point clouds.

Various types of positions of panchromatic and color cameras in camera set 140 are within the scope. For example, FIG. 3C illustrates an example where third camera 143 (being a color camera) is positioned on the stereo baseline formed by first camera 141 and second camera 142 (both being panchromatic cameras). The baseline formed by first camera 141 and third camera 143 can be adjustable. Similarly, the baseline formed by second camera 142 and third camera 143 can be adjustable. FIG. 3E illustrates another example where third camera 143 (being a color camera) is offset from the stereo baseline formed by first camera 141 and second camera 142 (both being panchromatic cameras). For example, the baseline formed by second camera 142 and third camera 143 is perpendicular to the baseline formed by first camera 141 and third camera 143, forming an L-shaped configuration.

Figure 3D:
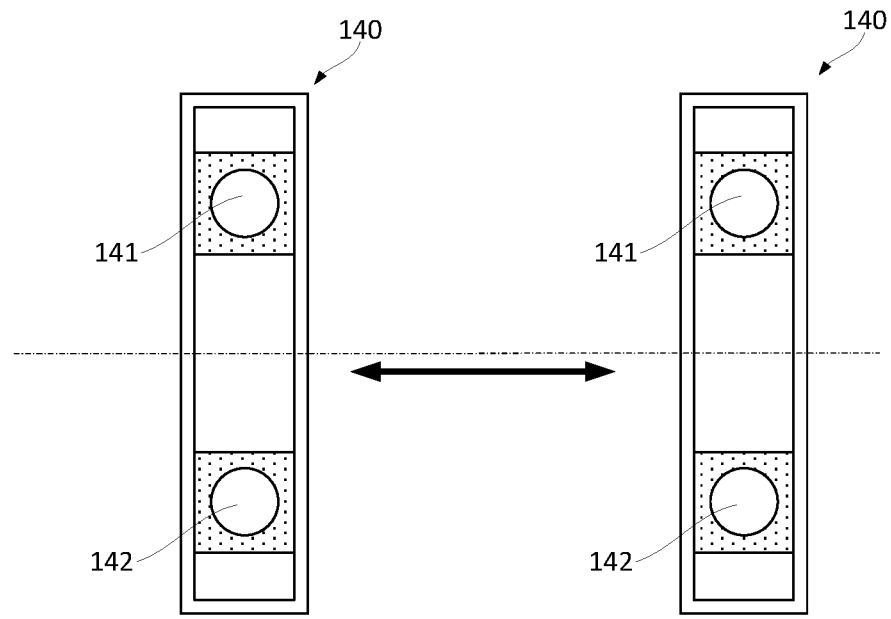
FIG. 3D is a schematic front view of a stereo camera set, used to obtain multiple sets of images at different positions of the stereo camera set relative to the inspected object, in accordance with some examples.
Figure 3E:
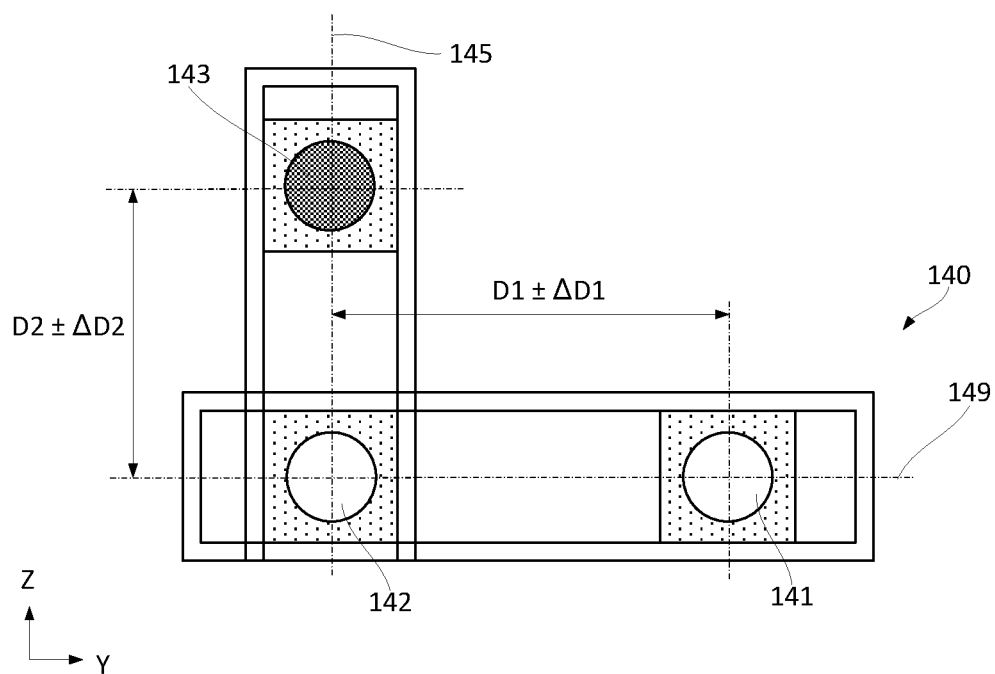
FIG. 3E is a schematic front view of a camera set comprising three different cameras, in accordance with some examples.

Referring to FIG. 3D, in some examples, the L-shaped configuration of camera set 140 can be replicated with a set that has only two cameras, which may be referred to as a two-camera set. In these examples, a two-camera set is used to obtain multiple images at different positions of this set relative to the object. The offset between these positions can be viewed as a "virtual baseline." This approach eliminates the need for additional cameras. However, it complicates the processing side of combining different sets of images. It is important to note that in these examples, object 192 has to remain stationary while camera set 140 moves thereby preserving the reference geometry.

Examples of Inspection Methods

Figure 4:
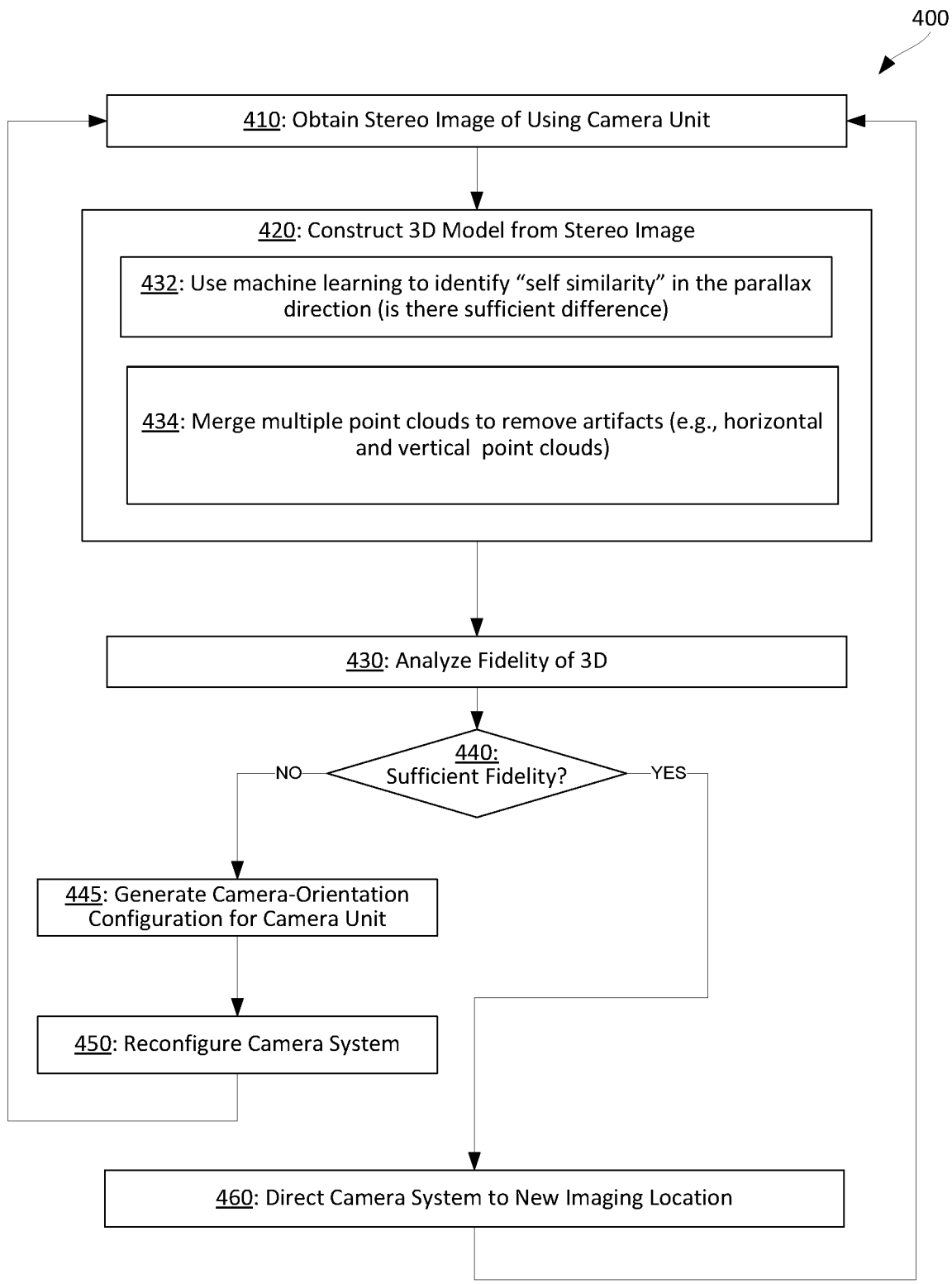
FIG. 4 is a process flowchart corresponding to a method of inspecting an object using a mobile inspection system, in accordance with some examples.
Figure 5:
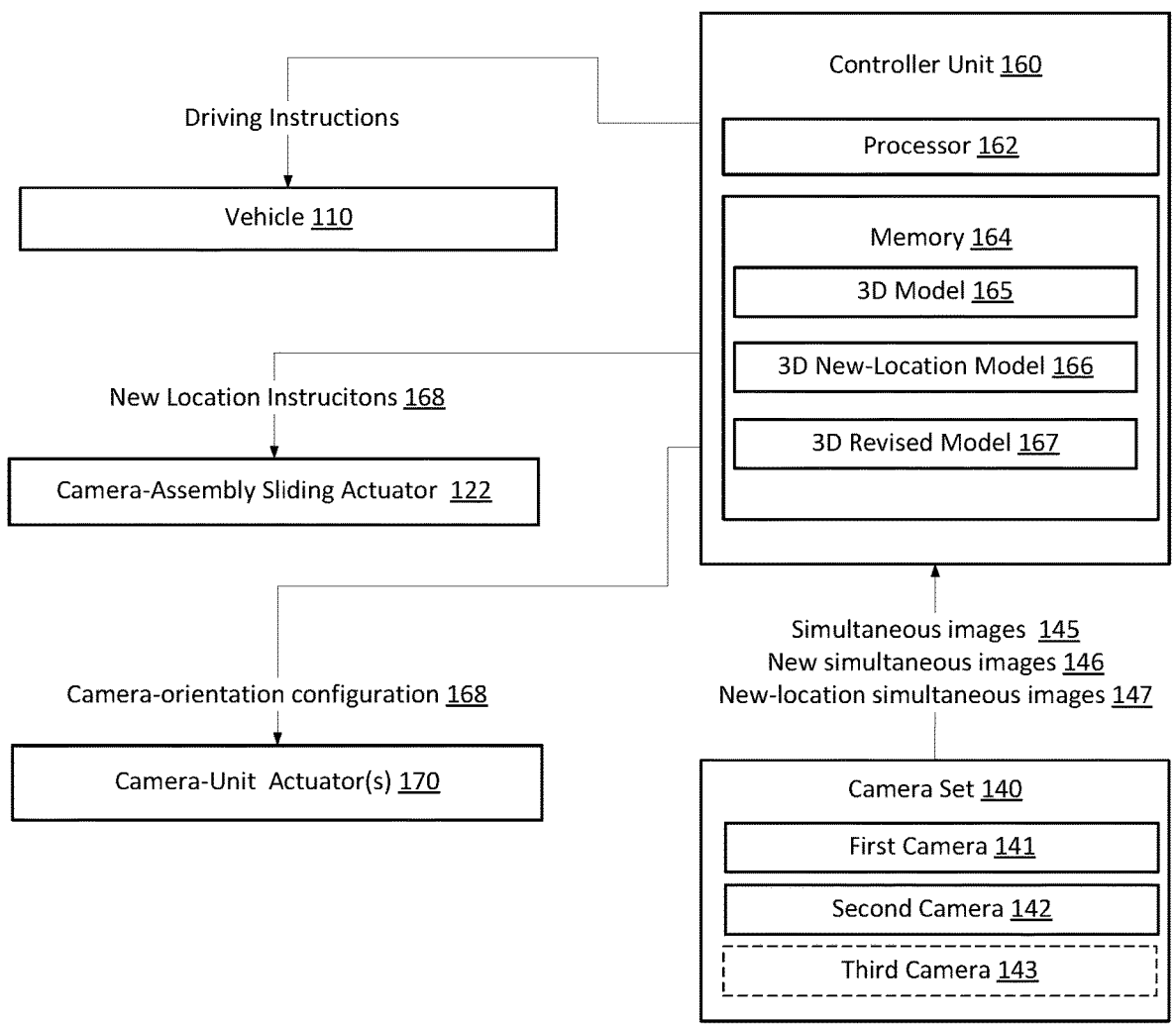
FIG. 5 is a block diagram illustrating different data and/or instructions passed between different components of the mobile inspection system, in accordance with some examples.

FIG. 4 is a process flowchart corresponding to method 400, which may be used for obtaining a high-quality visual representation of object 192, in accordance with some examples. Method 400 may utilize camera unit 130, various examples of which are described above. For example, camera unit 130 comprises camera set 140, support structure 132, camera-unit actuator 170, and control unit 160. Camera set 140, in turn, comprises first camera 141 and second camera 142, arranged as a stereo pair and each obtaining one of plurality of simultaneous images 145. First camera 141 and second camera 142 collectively establish stereo axis 149 of camera set 140. Various communication aspects among different components of camera unit 130 and, more generally, mobile inspection system 100 are presented in FIG. 5.

In some examples, method 400 comprises (block 410) obtaining plurality of simultaneous images 145 of object 192 using camera set 140. When camera set 140 is a 2-camera set, this plurality of simultaneous images 145 may also be referred to as a stereo image and include two images, one for each camera. Plurality of simultaneous images 145 corresponds to a specific configuration of camera set 140, e.g., the orientation of first camera 141 and second camera 142 relative object 192. This configuration information is supplied to control unit 160 together with plurality of simultaneous images 145 for further processing. The type plurality of simultaneous images 145 also depends on the type of different cameras forming camera set 140, various examples of which are described above.

Method 400 may proceed with (block 420) constructing three-dimensional (3D) model 165 from plurality of simultaneous images 145. This operation is performed using control unit 160 of camera unit 130 or, more specifically, using processor 162 of control unit 160. Processor 162 used also in various other operations of method 400 described below. The output of processor 162 (e.g., 3D model 165) can be stored in memory 164 of control unit 160. Additional features of control unit 160 are described below with reference to FIG. 7.

3D model 165 may be also referred to as a 3D point cloud, which is a set of coordinates describing locations in space of various features identified in plurality of simultaneous images 145. Specifically, the stereo geometry of camera set 140 or, more generally, the current configuration of camera unit 130 is used to extract 3D information from plurality of simultaneous images 145, which are separately collected spatially separated imagery. For example, a photogrammetric method for extracting 3D information from stereo imagery can be used for locally matching conjugate points in two images a point in space imaged by two separate cameras. Furthermore, neural network-based methods, which employ deep learning algorithms, can be used to generate conjugate locations. It should be noted that stereo accuracy is important to precisely generate fully integrated 3D point clouds spanning the entire inspected object 192 (e.g., in a pair of cameras in one configuration, when this configuration changes, and also when the entire camera unit is moved on a gantry). Precise robotics for camera reconfiguration and special computational techniques allow expanding this stereo accuracy requirement beyond a conventional static stereo pair. In some examples, constructing 3D model 165 comprises identifying self-similarities among plurality of simultaneous images 145 of object 192 at least in directions parallel to stereo axis 149 of camera unit 130. For example, self-similarities among plurality of simultaneous images 145 of object 192 are identified using a machine learning algorithm.

Method 400 may proceed with (block 430) analyzing the fidelity of 3D model 165 and, when (decision block 440) the fidelity of 3D model 165 is insufficient, method 400 proceeds with (block 450) reconfiguring camera unit 130 using camera-unit actuator 170 such that stereo axis 149 of camera unit 140 has a different orientation relative to object 192. Thereafter, method 400 then proceeds with repeating previously described operations, i.e., (block 410) obtaining a plurality of new simultaneous images 146 of object 192 (with the reconfigured camera unit) and (block 420) reconstructing or, more specifically, updating 3D model 165 using plurality of new simultaneous images 146 with stereo axis 149 of camera unit 130 being in a different orientation relative to object 192.

In some examples, updating 3D model 165 comprises merging a point cloud generated based on plurality of simultaneous images 145 with a new point cloud generated based on plurality of new simultaneous images 146. Furthermore, updating 3D model 165 is performed using a set of spatial references associated with reconfiguring camera unit 130. For example, the set of spatial references corresponds to camera-orientation configuration 168 used by camera-unit actuator 170 for reconfiguring camera unit 130.

In some examples, (block 450) reconfiguring camera unit 130 comprises at least one of (a) rotating camera unit 130 relative to object 192 using camera-unit actuator 170, (b) tilting second camera 142 relative to support structure 132 and first camera 141 using camera-unit actuator 170, and (c) changing the baseline between first camera 141 and second camera 142. For example, FIG. 3B illustrates an example where the entire camera unit 130 is rotatable. This unit-level rotation preserves the orientation of various additional components (e.g., light units) relative to the cameras, which may be beneficial for some applications. Furthermore, this unit-level rotation can utilize a single actuator (e.g., a stepper motor, identified as camera-unit pivoting actuator 172 in FIG. 3A) for the entire camera unit 130 thereby simplifying the mechanical construction of camera unit 130. Overall, this unit-level rotation can be used to change the orientation of various stereo axes of camera unit 130 relative to object 192, e.g., to address the self-similarity issues. In some examples, (block 450) reconfiguring camera unit 130 comprises resetting the relative camera poses (e.g., due to the baseline changes and the parallax direction changes).

In some examples, second camera 142 is tilted relative to support structure 132 and first camera 141 using camera-unit actuator 170 or, more specifically, camera-tilting actuator 176. Some examples of such actuators are shown in FIGS. 2D and 2E and described below. Tilting second camera 142 relative to first camera 141 changes the orientation of the stereo axis formed by these cameras. This change can be relative to object 192 and/or relative to another stereo-axis (e.g., in a three-camera configuration shown in FIGS. 2D and 2E). Furthermore, multiple camera-tilting actuators 176 (e.g., one at each camera) can be used to change the orientation of the stereo axis without rotating the cameras about their own optical axes. In other words, the vertical/horizontal orientation of one or both cameras (in a stereo pair) is preserved even though the orientation of the stereo axis of this pair is changed.

In additional examples, the baseline between first camera 141 and second camera 142 can be changed using, e.g., camera-spacing actuator 178. For example, the baseline can be decreased when there is an insufficient number of conjugate pairs in simultaneous images 145 obtained by first camera 141 and second camera 142, and more overlap is needed. It should be noted that this insufficient number of conjugate pairs can depend on the type of object 192 (being imaged), light, and other conditions that are independent of the camera characteristics (such as their field of view). On the other hand, the baseline between first camera 141 and second camera 142 can be increased when an additional/larger area of object 192 needs to be captured in simultaneous images 145.

In some examples, (block 450) reconfiguring camera unit 130 is performed using camera-orientation configuration 168 generated by control unit 160 based on 3D model 165.

Referring to FIG. 4, (block 440) when fidelity of 3D model 165 is sufficient, method 400 proceeds with (block 460) moving camera unit 130 on gantry 120 to a new imaging location relative to object 192. Various operations are then repeated, such as (block 410) obtaining plurality of simultaneous new-location images 147 of object 192 using camera set 140 and (block 420) constructing 3D new-location model 166 from plurality of simultaneous new-location model images 147 using control unit 160. More specifically, 3D new-location model 166 is combined with 3D model 165 to derive a revised 3D model 167.

Experimental Results

Figure 6:
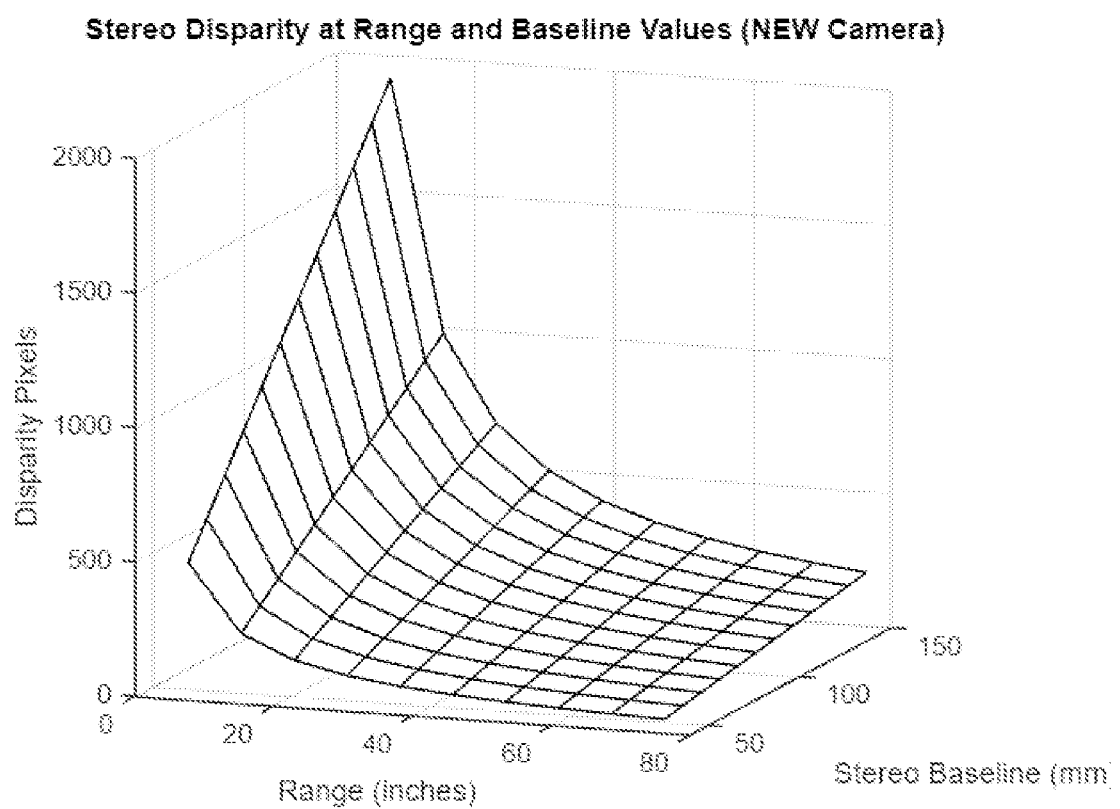
FIG. 6 is a plot illustrating a number of disparity pixels as a function of the stereo baseline and the range to imaged object point.

FIG. 6 illustrates stereo pixel disparity and baseline diversity for a three-camera system comprising a left camera, a middle camera, and a right camera. The three-camera system includes three baselines: (a) left-to-middle; (b) right-to-middle; and (c) left-to-right. These three baselines produce a baseline diversity that helps with stereo-matching. It should be noted that stereo imaging is classically a matching problem with two views trying to match conjugate points with disparity not being too great or too small. The disparity that is too small is easily confused with noise, too large and it may be missed due to search range boundaries. Baseline diversity offers a method of having variable sensitivity to camera-to-object distance all in a single camera system.

Control Unit/Computer System Examples

Figure 7:
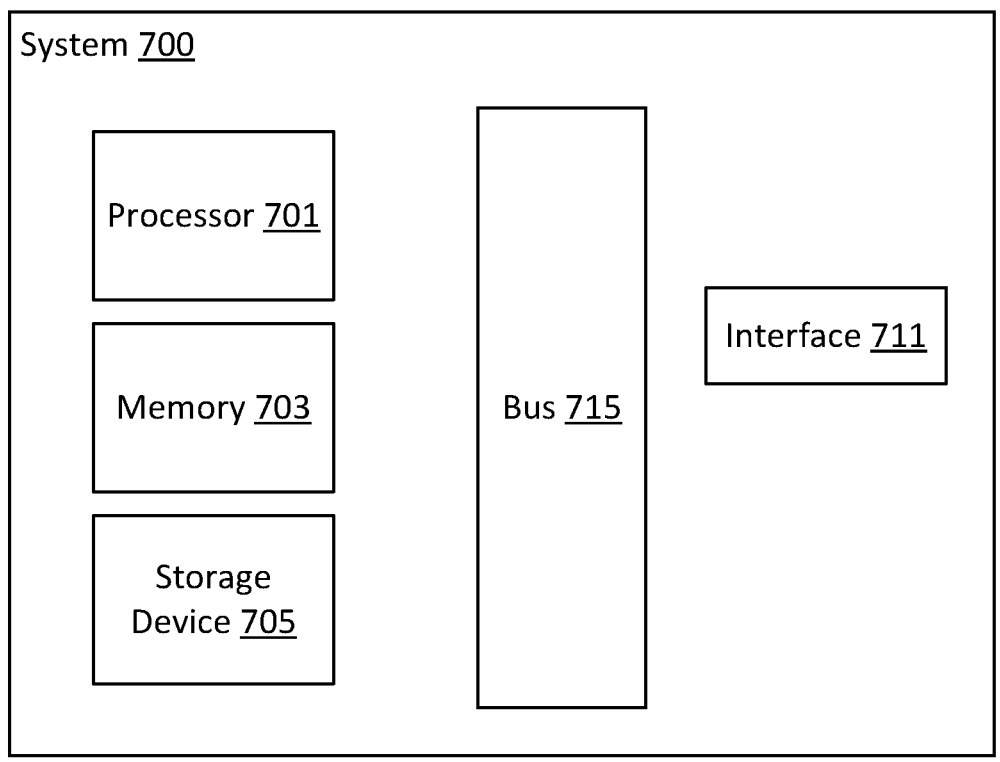
FIG. 7 is a block diagram of a control unit used in a mobile inspection system, in accordance with some examples.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate a variety of devices such as an application server, a database server, or any other device or service described herein. Although a particular configuration is described, a variety of alternative configurations are possible. The processor 701 may perform the operations described above. Instructions for performing such operations may be embodied in memory 703, on one or more non-transitory computer-readable media, or on some other storage device. Various specially configured devices can also be used in place of or in addition to the processor 701. Interface 711 may be configured to send and receive data packets over a network. Examples of supported interfaces include but are not limited to Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user. In some embodiments, computing system 700 may be implemented in a cloud computing environment.

CONCLUSION

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present examples are to be considered illustrative and not restrictive.

What is claimed is:

1. A method comprising:
   obtaining a plurality of simultaneous images of an object using a camera set, wherein:
     the camera set comprises a first camera and a second camera, each obtaining one of the plurality of simultaneous images and collectively establishing a stereo axis of the camera set,
     the camera set is a part of a camera unit further comprising one or more light units, a support structure maintaining stable relative positions of the camera set and light units, and a camera-unit actuator,
     the one or more light units normalize major variations of ambient light conditions, thereby reducing camera integration times and providing consistent image characteristics to benefit machine learning performance, and
     the one or more light units illuminate for a duration between 100-200 microseconds during which the camera set obtains the plurality of simultaneous images, thereby producing consistent images for constructing a three-dimensional (3D) model;
   constructing a three-dimensional (3D) model from the plurality of simultaneous images using a control unit of the camera unit; and
   when fidelity of the 3D model is insufficient,
     (a) reconfiguring the camera unit using the camera-unit actuator such that the stereo axis of the camera unit has a different orientation relative to the object,
     (b) obtaining a plurality of new simultaneous images of the object, and
     (c) updating the 3D model using the plurality of new simultaneous images with the stereo axis of the camera unit being in a different orientation relative to the object.

2. The method of claim 1, wherein reconfiguring the camera unit comprises at least one of (a) rotating the camera unit relative to the object using the camera-unit actuator, and (b) tilting the second camera relative to the support structure and the first camera using the camera-unit actuator.

3. The method of claim 2, wherein reconfiguring the camera unit further comprises changing a baseline between the first camera and the second camera.

4. The method of claim 1, wherein reconfiguring the camera unit is performed using a camera-orientation configuration generated by the control unit based on the 3D model.

5. The method of claim 1, wherein reconfiguring the camera unit is performed until the fidelity of the 3D model is sufficient.

6. The method of claim 1, wherein the camera unit further comprises a third camera having a different type than either the first camera or the second camera.

7. The method of claim 6, wherein:
each of the first camera and the second camera is a panchromatic camera, and
the third camera is a color camera.

8. The method of claim 6, wherein the third camera is positioned on the stereo axis formed by the first camera and the second camera.

9. The method of claim 6, wherein:
the second camera and the third camera form an additional stereo axis, and
the additional stereo axis is substantially perpendicular to the stereo axis formed by the first camera and the second camera.

10. The method of claim 9, wherein the stereo axis and the additional stereo axis intersect at an optical axis of the second camera.

11. The method of claim 6, wherein the third camera is movable relative to the support structure and the first camera using the camera-unit actuator.

12. The method of claim 1, wherein the first camera is both slidable and tiltable relative to the second camera using the camera-unit actuator.

13. The method of claim 1, wherein constructing the 3D model comprises identifying self-similarities among the plurality of simultaneous images of the object at least in directions parallel to the stereo axis of the camera unit.

14. The method of claim 13, wherein the self-similarities among the plurality of simultaneous images of the object are identified using a machine learning algorithm.

15. The method of claim 1, wherein updating the 3D model comprises merging a point cloud generated based on the plurality of simultaneous images with a new point cloud generated based on the plurality of new simultaneous images.

16. The method of claim 1, wherein updating the 3D model is performed using a set of spatial references associated with reconfiguring the camera unit.

17. The method of claim 16, wherein the set of spatial references corresponds to camera-orientation configuration used by the camera-unit actuator for reconfiguring the camera unit.

18. The method of claim 1, further comprising, when the fidelity of the 3D model is sufficient:
moving the camera unit on a gantry to a new location relative to the object;
obtaining a plurality of simultaneous new-location images of the object using the camera set;
constructing a 3D new-location model from the plurality of simultaneous new-location model images using the control unit; and
combining the 3D new-location model and the 3D model to derive a revised 3D model.

19. A mobile inspection system for inspecting an object, the mobile inspection system comprising:
a vehicle;
a gantry, attached to the vehicle and comprising a gantry actuator;
a camera unit, slidably attached to the gantry and comprising:
a camera set, comprising a first camera and a second camera, each configured to obtain one of a plurality of simultaneous images and collectively establishing a stereo axis of the camera set;
a camera unit comprising the camera set and one or more light units and a support structure configured to maintain stable relative positions of the camera set and light units;
a control unit, communicatively coupled to the camera set and configured to construct a three-dimensional (3D) model, having a fidelity, from the plurality of simultaneous images; and
a camera-unit actuator, communicatively coupled to the control unit and mechanically coupled to the camera set, wherein the camera-unit actuator is operable to reconfigure the camera unit, when the fidelity of the 3D model is insufficient, such that the stereo axis of the camera unit has a different orientation relative to the object.

20. The method of claim 1, wherein updating the 3D model comprises merging a point cloud generated based on the plurality of simultaneous images and a current configuration of the camera unit with a new point cloud generated based on the plurality of new simultaneous images using a set of spatial references associated with the reconfiguring of the camera unit.

* * * * *